H. M. CRAMER.
SPRAYER.
APPLICATION FILED MAR. 24, 1908.
918,512.
Patented Apr. 20, 1909.
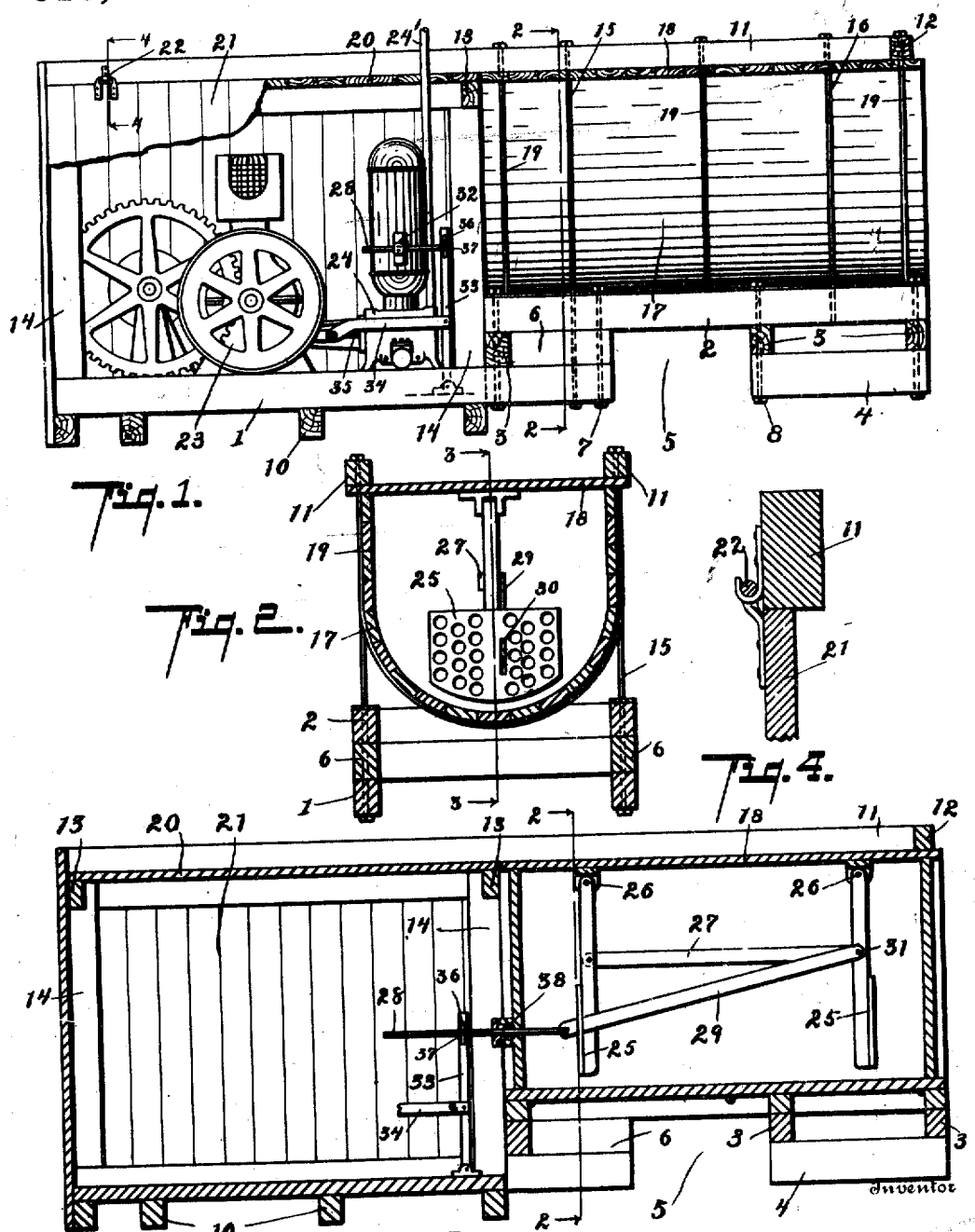

UNITED STATES PATENT OFFICE.

HARRY M. CRAMER, OF LANSING, MICHIGAN, ASSIGNOR TO "NEW WAY" MOTOR COMPANY, OF LANSING, MICHIGAN.

SPRAYER.

No. 918,512.      Specification of Letters Patent.      Patented April 20, 1909.

Application filed March 24, 1908. Serial No. 423,026.

*To all whom it may concern:*

Be it known that I, HARRY M. CRAMER, a citizen of the United States, residing at Lansing, Michigan, have invented certain new and useful Improvements in Sprayers, of which the following is a specification.

The invention relates to improvements in sprayers.

The main objects of this invention are,— First, to provide an improved wagon body for power sprayer apparatus which includes a tank and housing for the motor and the pump. Second, to provide an improved sprayer apparatus adapted for use in spraying fruit trees and the like, which shall be very efficient for the purpose and convenient to operate. Third, to provide in an apparatus of the class described an improved agitating means for the spraying solution.

Further objects and objects relating to details of construction will definitely appear from the detailed description to follow.

I accomplish the objects of my invention by the devices and means described in the following specification.

The device is clearly defined and pointed out in the claims.

A structure embodying the features of my invention is illustrated in the accompanying drawing, forming a part of this specification, in which, Figure 1 is a side elevation of a structure embodying the features of my invention, one of the side walls for the engine housing being removed to show the structure thereof. Fig. 2 is a vertical section taken on a line corresponding to line 2—2 of Figs. 1 and 3. Fig. 3 is a longitudinal section taken on a line corresponding to line 3—3 of Fig. 2. Fig. 4 is a detail section, showing one of the removable side walls and the supports or hinge members thereof.

In the drawing similar numerals of reference refer to similar parts throughout the several views, and the sectional views are taken looking in the direction of the little arrows at the ends of the section lines.

Referring to the drawing, the longitudinal sills are preferably made up of sections 1 and 2, the sections being overlapped, and the forward sill sections being above and spaced from the rear sill sections. The rear bed piece 3 of the forward sections is arranged between the front and rear sill sections and between the forward sill sections and the bolster pieces 4, the bolster pieces being arranged in alinement with the rear sill sections and spaced therefrom to form an undercut, as 5. Spacing blocks, as 6, are arranged between the overlapped sill sections and they are secured together by bolts 7. The bolster pieces of the forward sill sections are also connected by bolts, as 8, the sections of the sills and the bolster pieces being thereby rigidly secured together. Suitable cross sills or bed pieces 10 are provided for the rear sill sections. The top rails 11 of the frame are connected by cross pieces 12 and 13—13, and the top rails are also connected to the longitudinal sills by uprights 14. The top rails are further connected to the longitudinal sills by bolts or threaded rods 15 and 16, the rods 15 being arranged through the overlapped ends of the sill sections. Suitable tightening means, as nuts, are provided.

A tank 17, preferably made up of longitudinally arranged staves, is arranged on the bed pieces 3 of the forward sill sections. The cover 18 of the tank is preferably made up of pieces laid crosswise of the tank with their ends projecting under the top rails, as clearly appears from the drawing. The hoops 19 of the tank are arranged through the top rails and are provided with nuts so that they may be tightened in clamping the top in place as well as adjusting the staves of the tank. The frame at the rear of the tank is provided with a platform 20, which is preferably arranged so that the top of the tank forms an extension or continuation thereof. The platform is preferably removable. The frame is also preferably provided with removable side walls 21, which are supported by the hooklike hinge members 22. This forms a housing for the engine 23 and the pump 24, the engine and pump being preferably that described in my application for Letters Patent filed June 28, 1907, Serial No. 381,297, for motor pumps. The discharge pipe 24' of the pump is preferably arranged through the platform so that the operator may manipulate the spraying hose, not illustrated, from the platform. This discharge pipe can be arranged through this rear wall or in any other position desired.

As the details of the pump and engine form no part of this invention, I do not illustrate and describe the same herein.

I preferably provide in my improved spraying apparatus an agitator comprising a pair of paddles 25 which are supported by pivots 26, the paddles extending well toward the bottom of the tank, so that, as they are moved back and forth, the solution is agitated. These paddles are connected by a link 27 so that they are operated together. The paddles are connected to the engine by means of the connecting rod 28 arranged through the rear wall of the tank and connected to the paddles by means of the link 29, the link being arranged through the slot 30 of the rear paddle and pivoted at 31 to the forward paddle. The rear end of the connecting rod 28 is supported by a bearing 32 on the pump—see Fig. 1. On the frame is pivoted a lever 33 which is connected by the link 34 to the pump rod 35, so that, when the pump is operated, the agitator is operated. Connection for the lever to the connecting rod 28 is preferably in the form of a slot 36 in the lever and a pin 37 in the connecting rod arranged to engage this slot. The connecting rod is thus reciprocated through its packing box 38 with very little friction, and the connections are so located as to not interfere with the convenient operation of the engine.

By arranging the parts as I have illustrated and described, I secure a device which can be readily placed upon the running gears of a wagon, and the engine and tank are properly located and supported and the engine is protected from the spraying solution, the solution ordinarily used for spraying fruit trees and the like being very injurious to metal.

I have illustrated and described my invention in detail in the form preferred by me, but I am aware that it is capable of considerable variation in structural details without departing from my invention, and I desire to be understood as claiming the same specifically as well as broadly.

Having thus described my invention, what I claim as new and desire to secure by Letters Patent is:

1. In a structure of the class described, the combination with a frame, comprising longitudinal sills made up of overlapped sections, the forward sections being arranged above and in a spaced relation to the rear sections; bolster pieces arranged in alinement with the rear sill sections; bed pieces for said forward sill sections arranged between the same and the said rear sill sections and bolster pieces; said forward sill sections, bolster pieces and bed pieces being rigidly secured together; top rails; uprights connecting said sills and top rails; connecting bolts for said top rails and forward sill sections; a tank arranged on said bed pieces for said forward sill sections; a cover for said tank consisting of cross laid pieces extending under the said top rails; hoops for said tank arranged through said top rails, said hoops being provided with tightening means; a platform for said frame at the rear of said tank, the top of said tank being adapted to serve as a continuation of said platform; walls for said frame forming a housing at the rear of said tank; and a motor and pump arranged in said housing, the said pump having a discharge pipe arranged through the platform, for the purpose specified.

2. In a structure of the class described, the combination with a frame, comprising longitudinal sills made up of overlapped sections, the forward sections being arranged above and in a spaced relation to the rear sections; bolster pieces arranged in alinement with the rear sill sections; bed pieces for said forward sill sections arranged between the same and the said rear sill sections and bolster pieces, said forward sill sections, bolster pieces and bed pieces being rigidly secured together; top rails; uprights connecting said sills and top rails; connecting bolts for said top rails and forward sill sections; a tank arranged on said bed pieces for said forward sill sections; a cover for said tank consisting of cross laid pieces extending under the said top rails; hoops for said tank arranged through said top rails, said hoops being provided with tightening means; a platform for said frame at the rear of said tank, the top of said tank being adapted to serve as a continuation of said platform, said frame at the rear of said tank being adapted to receive a motor and pump, for the purpose specified.

3. In a structure of the class described, the combination with a frame, comprising longitudinal sills made up of overlapped sections, the forward sections being arranged above and in a spaced relation to the rear sections; bolster pieces; bed pieces for said forward sill sections arranged between the same and the said rear sill sections and bolster pieces, said forward sill sections, bolster pieces and bed pieces being rigidly secured together; top rails; a tank arranged on said bed pieces for said forward sill sections; a cover for said tank consisting of cross laid pieces extending under the said top rails; hoops for said tank arranged through said top rails, said hoops being provided with tightening means; a platform for said frame at the rear of said tank, the top of said tank being adapted to serve as a continuation of said platform; walls for said frame forming a housing at the rear of said tank; and a motor and pump arranged in said housing, the said pump having a discharge pipe arranged through the platform, for the purpose specified.

4. In a structure of the class described, the combination with a frame, comprising longitudinal sills made up of overlapped sections, the forward sections being arranged above and in a spaced relation to the rear sections; bolster pieces; bed pieces for said forward sill sections arranged between the same and the said rear sections and bolster pieces, said forward sill sections, bolster pieces and bed pieces being rigidly secured together; top rails; a tank arranged on said bed pieces for said forward sill sections; a cover for said tank consisting of cross-laid pieces extending under the said top rails; hoops for said tank arranged through said top rails, said hoops being provided with tightening means; and a platform for said frame at the rear of said tank, the top of said tank being adapted to serve as a continuation of said platform, said frame at the rear of said tank being adapted to receive a motor and pump, for the purpose specified.

5. In a structure of the class described, the combination with a frame, comprising longitudinal sills made up of overlapped sections, the forward sections being arranged above and in a spaced relation to the rear sections; bolster pieces arranged in alinement with the rear sill sections; bed pieces for said forward sill sections arranged between the same and the said rear sill sections and bolster pieces, said forward sill sections, bolster pieces and bed pieces being rigidly secured together; top rails; uprights connecting said sills and top rails; connecting bolts for said top rails and forward sill sections; a tank arranged on said bed pieces for said forward sill sections; a platform for said frame; walls for said frame forming a housing at the rear of said tank; and a motor and pump arranged in said housing, the said pump having a discharge pipe arranged through the platform, for the purpose specified.

6. In a structure of the class described, the combination with a frame, comprising longitudinal sills made up of overlapped sections, the forward sections being arranged above and in a spaced relation to the rear sections; bolster pieces arranged in alinement with the rear sill sections; bed pieces for said forward sill sections arranged between the same and the said rear sill sections and bolster pieces, said forward sill sections, bolster pieces and bed pieces being rigidly secured together; top rails connected to said longitudinal sills; a tank arranged on said bed pieces for said forward sill sections; a platform for said frame; walls for said frame forming a housing at the rear of said tank; and a motor and pump arranged in said housing, the said pump having a discharge pipe arranged through the platform, for the purpose specified.

7. In a structure of the class described, the combination with a frame, comprising longitudinal sills; top rails; a tank arranged in said frame; a cover for said tank consisting of cross-laid pieces extending under the said top rails; hoops for said tank arranged through said top rails, said hoops being provided with tightening means; a platform for said frame at the rear of said tank, the top of said tank being adapted to serve as a continuation of said platform; removable side walls for said frame forming a housing at the rear of said tank; and a motor and pump arranged in said housing, the said pump having a discharge pipe arranged through the platform, for the purpose specified.

8. In a structure of the class described, the combination with a frame, comprising longitudinal sills; top rails; a tank arranged in said frame; a cover for said tank consisting of cross-laid pieces extending under the said top rails; hoops for said tank arranged through said top rails, said hoops being provided with tightening means; a platform for said frame at the rear of said tank, the top of said tank being adapted to serve as a continuation of said platform; walls for said frame forming a housing at the rear of said tank; and a motor and pump arranged in said housing, the said pump having a discharge pipe arranged through the platform, for the purpose specified.

9. In a structure of the class described, the combination with a frame, comprising longitudinal sills; top rails; a tank arranged in said frame; a cover for said tank consisting of cross-laid pieces extending under the said top rails; hoops for said tank arranged through said top rails, said hoops being provided with tightening means; and a platform for said frame at the rear of said tank, the top of said tank being adapted to serve as a continuation of said platform, said frame at the rear of said tank being adapted to receive a motor and pump, for the purpose specified.

10. In a structure of the class described, the combination with a frame; a tank arranged in said frame; a platform for said frame; removable side walls for said frame forming a housing at the rear of said tank; and a motor and pump arranged in said housing, the said pump having a discharge pipe arranged through the platform, for the purpose specified.

11. In a structure of the class described, the combination with a frame; a tank arranged in said frame; a platform for said frame; walls for said frame forming a housing at the rear of said tank; and a motor and pump arranged in said housing, the said pump having a discharge pipe arranged through the platform, for the purpose specified.

12. In a structure of the class described, the combination with a frame, of a tank arranged therein; a pump; a driving engine therefor, said pump and engine being arranged in said frame; an agitator comprising a pair of paddles pivotally supported in said tank; a connecting link for said paddles; a connecting rod extending into said tank; a link arranged through one of said paddles and connected to the other and to said connecting rod; a pivoted lever connected at its swinging end to said connecting rod; and a link connected to said lever and to the piston rod of the pump.

13. In a structure of the class described, the combination with a frame, of a tank arranged therein; a pump; a driving engine therefor, said pump and engine being arranged in said frame; an agitator consisting of a pair of paddles pivotally supported in said tank; a connecting link for said paddles; a connecting rod extending into said tank; a link arranged through one of said paddles and connected to the other and to said connecting rod; and driving connections for said connecting rod and engine.

In witness whereof, I have hereunto set my hand and seal in the presence of two witnesses.

HARRY M. CRAMER. [L. S.]

Witnesses:
E. W. GOODNOW,
S. B. SPALDING.